United States Patent
Grefenstein et al.

(10) Patent No.: US 9,238,315 B2
(45) Date of Patent: Jan. 19, 2016

(54) RIGID FILM HAVING HIGH PUNCTURE RESISTANCE AND TEAR PROPAGATION RESISTANCE

(75) Inventors: Achim Grefenstein, Altrip (DE); Florian Brandmaier, Kolbenmoor (DE); Leonhard Maier, Babensham (DE)

(73) Assignee: RKW SE, Frankenthal (DE)

( * ) Notice: Subject to any disclaimer, the term of this patent is extended or adjusted under 35 U.S.C. 154(b) by 700 days.

(21) Appl. No.: 13/575,161

(22) PCT Filed: Jan. 28, 2011

(86) PCT No.: PCT/EP2011/000395
§ 371 (c)(1),
(2), (4) Date: Aug. 15, 2012

(87) PCT Pub. No.: WO2011/095303
PCT Pub. Date: Aug. 11, 2011

(65) Prior Publication Data
US 2012/0321866 A1    Dec. 20, 2012

(30) Foreign Application Priority Data
Feb. 5, 2010 (EP) .................................... 10001214

(51) Int. Cl.
| | | |
|---|---|---|
| *B32B 27/32* | (2006.01) |
| *B29C 43/22* | (2006.01) |
| *B29C 59/04* | (2006.01) |
| *B29K 23/00* | (2006.01) |
| *B32B 37/15* | (2006.01) |
| *B32B 38/06* | (2006.01) |

(52) U.S. Cl.
CPC ............... *B29C 43/222* (2013.01); *B32B 27/32* (2013.01); *B29C 59/04* (2013.01); *B29K 2023/06* (2013.01); *B29K 2023/12* (2013.01); *B32B 37/153* (2013.01); *B32B 38/06* (2013.01); *B32B 2323/04* (2013.01); *B32B 2323/10* (2013.01); *B32B 2553/00* (2013.01); *Y10T 428/24967* (2015.01); *Y10T 428/31913* (2015.04)

(58) Field of Classification Search
CPC .............. B29C 43/222; B29K 2023/06; Y10T 428/24967; Y10T 428/31913; B32B 27/32; B32B 38/06; B32B 37/153; B32B 2553/00; B32B 2323/10; B32B 2323/04
See application file for complete search history.

(56) References Cited

U.S. PATENT DOCUMENTS

| | | | |
|---|---|---|---|
| 3,634,553 A * | 1/1972 | Foglia et al. .................. | 428/35.1 |
| 5,024,799 A | 6/1991 | Harp et al. | |
| 2003/0001108 A1* | 1/2003 | Rangwalla et al. ......... | 250/492.3 |
| 2006/0057410 A1* | 3/2006 | Saavedra et al. .............. | 428/515 |

FOREIGN PATENT DOCUMENTS

| | | |
|---|---|---|
| CN | 2516336 | 10/2002 |
| DE | 38 17 223 A1 | 3/1989 |
| EP | 0 452 813 A2 | 10/1991 |
| EP | 0 616 880 B1 | 9/1994 |
| EP | 1 716 830 B1 | 11/2006 |
| GB | 1 087 036 A | 10/1967 |
| GB | 1 276 023 A | 6/1972 |
| WO | WO 00/58090 A1 | 10/2000 |
| WO | WO 01/30907 A1 | 5/2001 |

OTHER PUBLICATIONS

Chinese Search Report, Appl. No. 201180008211.4, Feb. 19, 2014, 2 pgs.
International Search Report, PCT/EP2011/000395, Apr. 13, 2011, 3 pgs.
European Search Report, EP 2 353 844 A1, Jun. 10, 2012, 4 pgs.

* cited by examiner

*Primary Examiner* — Aaron Austin
*Assistant Examiner* — Lawrence Ferguson
(74) *Attorney, Agent, or Firm* — Paul D. Strain; Strain & Strain PLLC

(57) ABSTRACT

The present invention relates to a film and a method for the production thereof, wherein a starting film web comprising at least one layer having a polypropylene content of at least 45% by weight and a polyethylene content in the same layer or in a further layer is produced, the starting film web is heated to the molten state of the polyethylene, yet to below the molten state of the polypropylene and the heated starting film web is passed through a cooled roller nip.

26 Claims, No Drawings

RIGID FILM HAVING HIGH PUNCTURE RESISTANCE AND TEAR PROPAGATION RESISTANCE

CROSS-REFERENCE TO RELATED PATENT APPLICATIONS

This application is a National Stage of International Application No. PCT/EP2011/000395, filed Jan. 28, 2011, which is based upon and claims the benefit of priority from prior European Patent Application No. 10001214.5, filed Feb. 5, 2010, the entire contents of all of which are incorporated herein by reference in their entirety.

The present invention relates to films having high rigidity and high puncture resistance that are suitable in particular for packaging and other, technical applications.

A continuous reduction in film thickness is limited in many packaging applications and in the application as surface protective film by the poor strength and, more particularly, the poor puncture resistance of thin films. If more tenacious materials are used, they are often more expensive and generally also result in a marked reduction in rigidity, which negatively affects the behavior on many packaging machines and requires slower line speeds.

From EP 1 716 830 B1 films are known that undergo a marked improvement in mechanical properties due to heat treatment carried out after extrusion by hot-embossing and recrystallization of the polymer mixture. Said films comprise mixtures of polyethylene (PE) and polypropylene (PP), wherein the polyethylene is always the excess component (max. 70 parts PP to 100 parts PE, i.e. the polypropylene portion comprises a maximum 42% by weight) and is therefore the matrix. Said films are used for hygiene applications due to their great softness. Due to their relatively low rigidity (also compared to the values measured before the heat treatment), a use as packaging film is neither considered nor mentioned Heat-treated plates and films for packaging purposes are described in EP 616 880 B1. However, the only aim is to improve the visual properties such as transparency. Moreover, the examples make no mention of mixtures of different polymers. The plates and films are made of pure polypropylene.

GB 1087036 relates to the production of packaging bands made of plastic mixtures, for example, of PP and PE. All the products mentioned therein are produced by drawing, for example, with an elongation ratio of 1:5 to 1:8 at temperatures of 95-105° C., that is, below the melting temperature of the polyethylene. This results in highly rigid packaging bands having an extremely low percent elongation at break (19-25% in the examples) that are unsimilar to the products according to the invention in terms of production and properties.

GB 1276023 describes a biaxially stretched film comprising mixtures of PE and PP. These films are also highly rigid and barely extensible (max. 80% percent elongation at break).

EP 452 813 A2 relates to the production of formed parts by cold forming mixtures of PP and PE at temperatures between the melting points of the two components. The objective is to obtain thermostable components. There is no mention of any improvement of the mechanical properties or of transferring the process to films.

U.S. Pat. No. 5,024,799 describes a special method for producing stretched and simultaneously embossed films made of polyolefins. The simultaneous stretching and embossing process takes place according to the general state of the art of that time at temperatures below the melting point, at 200° F. (93° C.) for polyolefins. The document makes no mention of the influence of temperature on the product properties or preferred mixing ratios.

WO 00/58090 describes a three-layer cast polyolefin film or an oriented polyolefin film that, after an embossing step, is available for subsequent metallization. In that case, at least one lightweight embossable outer layer made of a polyolefin having a lower melting point is used on a thermostable polypropylene core layer. The document does neither describe mixtures of different polyolefins nor the influence of the embossing temperature.

The object of the invention is to provide films having significantly greater puncture resistance and tear propagation resistance while at the same time the rigidity and strength as compared to packaging foils that are common today remain substantially unchanged. According to the invention, the film is stretched neither uniaxially nor biaxially. This means that the film web is drawn by no more than 10% in one of the two directions under the influence of temperature.

Surprisingly, it was found that films having PP as a matrix component (a total portion of at least 45% in at least one layer), mixed with polyethylene, after heat treatment at temperatures between the melting points of the components used, have excellent puncture resistance and tear propagation resistance and at the same time increased rigidity as compared to packaging films made of polyethylene and the hygiene films known from EP 1 716 830 B1.

As compared to typical packaging films made of mixtures of low-density polyethylene (LDPE) and linear low-density polyethylene (LLDPE), it was found that tenacity was increased by up to more than 3-fold while rigidity was increased or remained nearly the same. This was achieved by way of the polypropylene portion of at least 45% in at least one layer. Preferably the PP portion is at least 50%, more particularly at least 60%. If copolymers or heterophasic mixtures of PP and PE are used, the PE comonomer portion is apportioned to the PE phase according to the invention. Propylene-ethylene copolymers, especially random copolymers, can therefore be the only material in films according to the invention.

For single-layer films, mixtures of 45 to 95% PP with 55 to 5% PE are preferred, more particularly mixtures of 55 to 80% PP with 20 to 45% PE.

A multiple-layer design is advantageous. One layer made of PP and a second layer made of PE can be provided. A mixture of PP and PE can also be present in one or more or all layers. It is important that, according to the invention, at least one layer having 45% PP is present and that PE is present in said layer or in at least one further layer. According to the invention multiple-layer films are therefore useful that comprise a first layer having 45 to 100% PP and one or more further layers having up to 100% PE. Preferably, a mixture of PP and PE is present in all three layers. A structure of 100% PP homopolymer coextruded with cover layers made of pure PE, after hot-embossing at the temperatures according to the invention, results in only a slight improvement of the mechanical properties.

A structure having at least three layers is preferred, wherein the PP is present in a middle layer or the core layer and the cover layers made of PE have a lower portion of PP of <30% up to cover layers that are free of PP. The core layer can be made entirely of PP, or of a mixture of at least 45% PP with up to 55% PE, preferably of a mixture with 50 to 95% PP and 5 to 50% PE, more particularly 50 to 90% PP and 10 to 50% PE. It is furthermore preferrable for the core layer to be thicker than the cover layers.

Particularly preferred are multiple-layer, more particularly three-layer films comprising a first layer having 45 to 100%, preferably 60 to 90% PP and at least one further layer made of PE, or a mixture of PE having up to 45%, preferably a maximum of 30% PP.

It is understood that, in the films according to the invention, typical additives, fillers, etc. can be added to all layers in the known quantities thereof and in a subordinate portion of up to 20% by weight, typically not more than 10% by weight and, more particularly, not more than 5% by weight other polymers.

Unless indicated otherwise, the term "polymer" includes homopolymers and copolymers and mixtures of two or more polymers. Polymers typically have a molar mass of at least 10,000, typically of a few 10,000 to a few 100,000 g/mol. The copolymers can be, for example, statistically (random), alternating, block, or graft copolymers.

Within the scope of the present invention, the term "film" refers to flat structures, the width and length of which are a multiple greater than the thickness thereof. The thickness is typically less than one millimeter up to a few micrometers.

Homopolymers, random copolymers and block copolymers are suitable as PP. Preferably, PP copolymers, more particularly random copolymers are used. PP random copolymers (trade name, for example, Borclear from Borealis, Clyrell from Lyondellbasell) having a comonomer portion of 5 to 30% by weight are particularly preferred. Ethylene, butene, hexene or octene can be used as comonomers. Ethylene is a preferred comonomer, especially in quantities of 5 to 30% by weight. As compared to PP homopolymers and PP block copolymers, the statistical incorporation of the comonomers into the polymer chain results in a marked lowering of the melting temperature (<150° C.) and improved miscibility with the PE portion, which is advantageous according to the invention.

Suitable as PE are, for example, LDPE, LLDPE and mixtures of two or more ethylene polymers. A preferred PE is a mixture of LDPE and LLDPE, preferably a mixture of 50 to 90% LDPE and 50 to 10% LLDPE, more particularly of 60 to 80% LDPE and 40 to 20% LLDPE. Further preferred as PE are mixtures of LDPE, LLDPE, and ethylene vinyl acetate (EVA). The comonomer in the LLDPE is preferably a butene, hexene or octene, or they can be mLLDPE produced on so-called metallocene or single-site catalysts.

According to the invention, the embossing temperature is between the melting temperatures of the PE component and the PP component. Within the scope of the present application and with respect to the polymeric materials, "melting point" or "melting temperature" are understood to mean the temperature at which the shear modulus of the material approaches zero. If they are polymers having crystalline portions or are crystalline polymers, the crystalline regions are (also) melted at this temperature. In terms of a layer, e.g. a film, the melting point is the temperature at which the entire layer fuses. If the layer is made of more than one material, all the components per se do not have to have a melting temperature at or below the melting point of the layer, but rather the melting point of the layer regularly corresponds to the melting temperature of the thermoplastic main component. For example, a film containing 60% calcium carbonate, 32% of a polymer having a crystallite melting temperature of 138° C. and 8% of a polymer having a crystallite melting temperature of 158° C. has a melting point of approximately 138° C.

Surprisingly, the films according to the invention are characterized not only by their good mechanical properties (a balanced rigidity/tenacity ratio), but also by their good weldability and the linear tearing behavior combined with tear propagation resistance that is increased compared to non-embossed films. Both of these properties are desired for packaging films.

The films according to the invention have a strength of 30 to 70 $N/mm^2$, a rigidity of 150 to 600 $N/mm^2$ and a percent elongation at break of 400 to 1200%.

Products having greater rigidity (and a greater total proportion of polypropylene) of approximately greater than 300 $N/mm^2$ can be used in thicknesses of 20 to 80 µm in particular as packaging films and technical films, while products having a stiffness of less than 400 $N/mm^2$ (and a lower total proportion of polypropylene and/or a higher copolymer portion, in particular of PP random copolymers with ethylene) in thicknesses of less than 20 µm may also be considered as thinner alternatives to the hygiene films according to EP 1 716 830 B1 since they have greater strength, rigidity and puncture resistance and tear propagation resistance combined with the same softness.

The invention is explained by reference to the following examples without being limited to the specially described embodiments. Unless indicated otherwise or provided the context does not require otherwise, the percentages are based on the weight, when in doubt relative to the total weight of the mixture.

The invention also relates to all combinations of preferred embodiments, provided they are not mutually exclusive. When used in conjunction with a numerical value, the designations "around" or "approximately" mean that values that are higher or lower by at least 10% or values that are higher or lower by 5% and, in every case, values that are higher or lower by 1% are included.

EXAMPLES

The following materials were used:

| Material | Description | Density at 23° C. | MFI according to ISO 1133* | DSC melting point ISO 3146 |
| --- | --- | --- | --- | --- |
| LDPE |  | 0.923 kg/dm$^3$ | 0.75 g/10 min | 113° C. |
| LLDPE1 | C6 as comonomer | 0.92 kg/dm$^3$ | 0.9 g/10 min | 127° C. |
| LLDPE2 | C8 as comonomer | 0.92 kg/dm$^3$ | 1.1 g/10 min | 127° C. |
| PP1 | Random copolymer with 9% by weight ethylene | 0.91 kg/dm$^3$ | 1.5 g/10 min | 140° C. |
| PP2 | Heterophasic block copolymer having 5% by weight comonomer | 0.905 kg/dm$^3$ | 3.0 g/10 min | 162° C. |
| PP3 | Heterophasic block copolymer having 2% comonomer | 0.900 kg/dm$^3$ | 0.8 g/10 min | 165° C. |

| Material | Description | Density at 23° C. | MFI according to ISO 1133* | DSC melting point ISO 3146 |
|---|---|---|---|---|
| PP4 | Heterophasic random copolymer having 10 wt % comonomer | 0.905 kg/dm$^3$ | 1.0 g/10 min | 140° C. |

*MFI measured at 190° C./2.16 kg for PE and 230° C./2.16 kg for PP)

Example 1

A symmetrical film having a core layer of 21 μm and two cover layers of 12 μm was produced using the blown film method. The core layer consisted of PP1, the cover layers consisted of a mixture of 70% LDPE and 30% LLDPEI. The starting film was heated to 130° C. and was run through a cooled roller nip. For the film, strength, rigidity (secant modulus at 5% elongation read from the stress-strain curve) and percent elongation at break were measured in both the machine direction and the transverse direction according to ISO 527 on 15 mm-wide strips at a draw-off rate of 500 mm/min.

The maximum impact height is measured as follows: The films are clamped into the testing device individually and lying flat and without folds. A metal bolt having a mass of 100 g is dropped from different heights onto the clamped foil. A test is considered poor if the film is torn completely (tear or hole) at one point, otherwise it is good. Several tests are always carried out. The impact height is the drop height from which two tests are good and two tests are poor. For the determination, the approximate height is determined and then the height is lowered in 5 cm-increments if three or more tests are poor, or it is raised if more than three tests are good.

The results are listed in table 2.

Comparative Example 1

A starting film was produced as described in example 1. However, embossing was carried out at 114° C., that is, below the melting temperature of the polyethylenes as well. The mechanical properties are also presented in table 2.

Example 2

A film was produced as described in example 1, although with a core layer made of 60% PP1 and 40% LLDPE2. The mechanical properties are also presented in table 2.

Comparative Example 2

A film was produced as described in example 1, although with 25% PP1 and 75% LLDPE2 in the core layer. The mechanical properties are also presented in table 2.

Example 3

A film was produced as described in example 1, although comprising a core layer made of 100% PP2 and embossing at 153° C. The mechanical properties are also presented in table 2.

Comparative Example 3

A film was produced as described in example 1, although with 70% PP1 and 30% LLDPE2 in the core layer. Embossing was not carried out. The mechanical properties are also presented in table 2. This film corresponds to the packaging foil that is frequently used at this time.

TABLE 2

Application as packaging films 45 μm

| Example | Core structure | Embossing temperature [° C.] | Firmness [N/mm$^2$] | Stiffness [N/mm$^2$] | Percent elongation at break [%] | Max. impact height [mm] |
|---|---|---|---|---|---|---|
| Example 1 | 100% PP1 | 130 | 36.9/30.9 | 265/256 | 473/634 | 1200 |
| Comparative example 1 | 100% PP1 | 114 | 31.4/27.6 | 278/261 | 421/650 | 500 |
| Example 2 | 60% PP1 40% LDPE | 130 | 34.7/36.5 | 164/174 | 567/867 | 1500 |
| Comparative example 2 | 25% PP1 75% LDPE | 130 | 34.1/30.2 | 111/103 | 540/775 | 1250 |
| Example 3 | 100% PP2 | 153 | 38.6/27.6 | 463/385 | 483/605 | 1050 |
| Comparative example 3 | 70% LDPE 30% LLDPE2 | unembossed | 26.1/27.1 | 163/157 | 423/672 | 450 |

Example 4

A symmetrical film having a core layer of 29 μm and two cover layers of 8 μm was produced using the blown film method. The core layer and the cover layers consisted of PP1. The starting film was heated to 130° C. and was run through a cooled roller nip. For the film, the strength, rigidity (secant modulus at 5% elongation read from the stress-strain curve) and percent elongation at break were measured as described above, and the maximum impact height was determined. In addition, the tear propagation resistance in the machine direction and the transverse direction were measured according to ISO 527 on 15 mm-wide strips at a draw-off rate of 500 mm/min. The mechanical properties are also presented in table 3.

Comparative Example 4

A film was produced as described in example 4, although without embossing. The mechanical properties are also presented in table 3.

Example 5

A film was produced as described in example 4, although with a core layer made of PP2 and cover layers made of a mixture of 70% LDPE and 30% LLDPE1. The mechanical properties are also presented in table 3.

Comparative Example 5

A film was produced as described in example 5, although without embossing. The mechanical properties are also presented in table 3.

Example 7

A film was produced as described in example 6, although comprising a core layer made of a mixture of ⅔ PP4 and ⅓ PP3. Embossing was carried out at 134° C. The mechanical properties are also presented in table 4.

Comparative Example 7

A film was produced as described in example 7, although without embossing. The mechanical properties are also presented in table 4.

TABLE 3

Use of packaging films 45 μm

| Example | Film structure | Embossing temperature [° C.] | Firmness [N/mm$^2$] | Stiffness [N/mm$^2$] | Percent elongation at break [%] | Max. impact height [mm] | Tear propagation resistance [mN] |
|---|---|---|---|---|---|---|---|
| Example 4 | 100% PP1 in all layers | 130 | 60.5/45.5 | 398/319 | 589/649 | 1000 | 385/12395 |
| Comparative example 4 | 100% PP1 in all layers | unembossed | 48.5/44.1 | 398/423 | 688/708 | 600 | 314/345 |
| Example 5 | Cover layers 70% LDPE/ 30% LLDPE1; middle layer PP2 | 130 | 53.6/41.0 | 443/379 | 697/767 | 1400 | 2196/11129 |
| Comparative example 5 | Cover layers 70% LDPE/ 30% LLDPE1; middle layer PP2 | unembossed | 49.3/40.0 | 451/417 | 910/921 | 950 | 439/5513 |

Example 6

A symmetrical film having a core layer of 6.9 μm and two cover layers of 3.3 μm was produced using the blown film method. The core layer consisted of PP4, the cover layers consisted of a mixture of 46% LDPE and 30% LLDPE1 and 22% PP3. The starting film was heated to 139° C. and was run through a cooled roller nip. For the film, the strength, rigidity (secant modulus at 5% elongation read from the stress-strain curve) and percent elongation at break were measured and the maximum impact height was determined as described above. The mechanical properties are summarized in table 4.

Comparative Example 6

A film was produced as described in example 6, although without embossing. The mechanical properties are also presented in table 4.

Example 8

A film was produced as described in example 6, although with a core layer made of 100% PP3. Embossing was carried out at 134° C. The mechanical properties are also presented in table 4.

Comparative Example 8

A film was produced as described in example 8, although without embossing. The mechanical properties are also presented in table 4.

Comparative Example 9

A film was produced as described in example 6, although with a mixture of 46% LDPE, 30% LLDPE2 and 22% PP3 in the core layer. Embossing was carried out at 126° C. The mechanical properties are also presented in table 4.

Comparative Example 10

A film was produced as described in example 9, although without embossing. The mechanical properties are also presented in table 4.

TABLE 4

Use of hygiene films 13.5 μm

| Example | Core structure | Embossing temperature [° C.] | Firmness [N/mm$^2$] | Stiffness [N/mm$^2$] | Percent elongation at break [%] | Max. impact height [mm] |
|---|---|---|---|---|---|---|
| Example 6 | 100% PP4 | 139 | 57.2 | 226 | 397/743 | 510 |
| Comparative example 6 | 100% PP4 | no | 54.0 | 313 | 459/760 | 240 |
| Example 7 | 66% PP4 and 33% PP3 | 134 | 66.3 | 271 | 405/779 | 400 |
| Comparative example 7 | 66% PP4 and 33% PP3 | no | 55.0 | 336 | 481/752 | 190 |

TABLE 4-continued

Use of hygiene films 13.5 μm

| Example | Core structure | Embossing temperature [° C.] | Firmness [N/mm²] | Stiffness [N/mm²] | Percent elongation at break [%] | Max. impact height [mm] |
|---|---|---|---|---|---|---|
| Example 8 | 100% PP3 | 134 | 69.2 | 302 | 420/719 | 230 |
| Comparative example 8 | 100% PP3 | no | 59.9 | 395 | 431/625 | 150 |
| Comparative example 9 | 46% LDPE/30% LLDPE2/22% PP3 | no | 43.3 | 309 | 277/645 | 140 |
| Comparative example 10 | 46% LDPE/30% LLDPE2/22% PP3 | 126 | 46.8 | 236 | 248/691 | 230 |

The results show that the composition as well as the hot-embossing are essential to success. For instance, the maximum impact height increases to 1200 mm when 100% PP1 (random copolymer) is used, as compared to 450 mm in the case of the usual mixture of LDPE and LLDPE (comparative example 3). The percent elongation at break remains at the same level while the strength and rigidity increase considerably. The strength or impact height of the same film are hardly improved as compared to the reference film given embossing temperatures below the melting point of the lowest melting component (comparative example 1). The film thickness cannot be reduced as desired in comparative example 1.

A comparison with respect to the quantity of PP in the core, examples 1, 2 and comparative example 2, demonstrates the loss of rigidity when the content of PP is too low. The use of a PP block copolymer, PP2 in example 3, makes it possible to increase the strength and the rigidity to a very great extent, and the impact height is much higher than the level of the usual packaging films (comparative example 3).

Table 3 shows the influence of hot-embossing at temperatures between the melting points of the PP component and the PE component. By way of the process, the strength, especially in MD direction and, mainly, the puncture resistance and the tear propagation resistance can be increased significantly while the rigidity and percent elongation at break remain nearly unchanged.

Table 4 shows the influence of the PP content, which is increased compared to the prior art, and the presence of a PP matrix in at least one layer. Especially by using a flexible, heterophasic random copolymer in high proportions in at least one layer (examples 6 and 7), the puncture resistance increased by more than 100% after the embossing process. The improvements after the soft-embossing process according to the prior art are much less, however (comparative examples 9 and 10). Moreover, all the examples 6 to 8 according to the invention having a PP content of more than 45% in the middle layer (and in the total structure of the film) have improved strength, rigidity and percent elongation at break as compared to the comparative examples having a lower portion of PP in all layers. This was not expected according to EP 1 716 830 B1.

The measurement results therefore show that substantially improved films could be made available by way of the films according to the invention, in which hot-embossing and a portion of at least 45% PP and, therefore, a PP matrix is present in at least one layer. It is therefore possible to reduce the thicknesses and make the packaging or the hygiene product safer as compared to the films typically used up to now.

The invention claimed is:

1. A film having a secant-E-modulus at 5% elongation, as measured according to ISO 527, of 150-600 N/mm², a tensile strength according to ISO 527 of 30-70 N/mm² and a percent elongation at break according to ISO 527 of 400-1200%, comprising at least one layer having a polypropylene content of at least 45% by weight and a polyethylene content in the same layer or in a further layer that is obtained by producing a starting film web, heating the starting film web to the molten state of the polyethylene, but to below the molten state of the polypropylene and passing the heated starting film web through a cooled roller nip.

2. The film according to claim 1, wherein the film consists of a single layer.

3. The film according to claim 2, wherein the single layer contains a maximum of 55% by weight of polyethylene.

4. The film according to claim 2, wherein the polypropylene component of the single layer is composed predominantly of a propylene random copolymer having a melting point below 150° C.

5. The film according to claim 1, wherein the film comprises multiple layers and a mixture of polypropylene and polyethylene is present in all layers.

6. The film according to claim 5, wherein the film comprises a core layer having a polypropylene content of at least 45% by weight, and one or two cover layers having a polyethylene content of at least 55% by weight.

7. The film according to claim 1, wherein the polypropylene is selected from homopolymers, random copolymers, block copolymers, heterophasic block copolymers or mixtures of two or more thereof.

8. The film according to claim 7, wherein the polypropylene is a random copolymer with ethylene.

9. The film according to claim 1, wherein the polyethylene is selected from low-density polyethylene, linear low-density polyethylene having butene, hexene or octene as comonomer, and mixtures of two or more thereof or mixtures thereof with ethylene vinyl acetate.

10. The film according to claim 9, wherein the polyethylene is a mixture of low-density polyethylene with linear low-density polyethylene having butene, hexene or octene as comonomer.

11. The film according to claim 4, wherein the total portion of polypropylene in the film is at least 45% by weight.

12. The film according to claim 4, wherein the cover layers are thinner than the core layer.

13. The film according to claim 1, wherein the starting film web has a thickness in the range of 5 to 80 μm.

14. A method for the production of a film according to claim 1, wherein a starting film web comprising at least one layer having a polypropylene content of at least 45% by weight and a polyethylene content in the same layer or in a further layer is produced, the starting film web is heated to the molten state of the polyethylene, but to below the molten state of the polypropylene and the heated starting film web is passed through a cooled roller nip.

15. The method according to claim 14, wherein the cooling rollers have a smooth surface or a structured surface.

16. A method of packaging a product, comprising:
covering said product with the film according to claim 1.

17. A method of protecting a surface, comprising:
covering the surface with the film according to claim 1.

18. A hygiene product, comprising the film according to claim 1.

19. The film according to claim 3, wherein the single layer contains a maximum of 40% by weight of polyethylene.

20. The film according to claim 3, wherein the single layer contains a maximum of 20% by weight of polyethylene.

21. The film according to claim 5, wherein the film comprises a core layer having a polypropylene content of at least 45% by weight, and one or two cover layers having a polyethylene content of at least 70% by weight.

22. The film according to claim 8, wherein the polypropylene is a random copolymer having less than 30% by weight of ethylene as a comonomer and a melting point below 150° C.

23. The film according to claim 4, wherein the single layer contains a maximum of 20% by weight of polyethylene.

24. The film according to claim 5, wherein the polypropylene is a random copolymer having less than 30% by weight of ethylene as a comonomer and a melting point below 150° C. and the polyethylene is selected from homopolymers, random copolymers, block copolymers, heterophasic block copolymers or mixtures of two or more thereof.

25. The film according to claim 23, where the starting film web has a thickness in the range of 20 to 60 μm.

26. The film according to claim 24, wherein the starting film web has a thickness in the range of 20 to 60 μm.

* * * * *